March 30, 1965 M. MORSE 3,175,833
MULTI-RIBBED SEALING DEVICE
Filed April 2, 1963

3,175,833
MULTI-RIBBED SEALING DEVICE
Milton Morse, 41 Honeck St., Englewood, N.J.
Filed Apr. 2, 1963, Ser. No. 270,005
2 Claims. (Cl. 277—205)

This invention relates generally to resilient sealing devices, and more particularly to an improved form thereof especially adapted to effect a seal between a relatively fixed cylindrical wall and an axially and/or rotatably moving inner shaft. While not limited to any particular application, the invention has particular usefulness in such functions as providing hermetic or greased seals between a rotating shaft and a fixed bushing, or as a seal for the plunger element of a pump, and similar applications.

In the prior art, it is known to seal a rotating shaft within a bushing by forming semicircular cross-sectioned grooves in the inner surface of the bushing and the outer surface of the shaft. Within the space formed therebetween, a rubber or synthetic resinous O-ring is positioned which effects the required seal. Unfortunately, constructions of this type require very accurate tolerances to be fully effective, and in normal commercial production the cost of obtaining such close tolerances is prohibitive. Added to this disadvantage is the difficulty in seating the devices when the shaft is assembled within the bushing.

It is therefore among the principal objects of the present invention to provide a resilient device which may operate as a seal, in which the above-mentioned disadvantages have been substantially eliminated.

Another object of the invention lies in the provision of an improved ribbed-type sealing device having far greater flexibility radially than conventional O-rings, thereby permitting ready adjustment for inadequate or excessive tolerances between the parts to be sealed.

Still another object of the invention lies in the provision of sealing devices of the class described which may be formed using conventional molding techniques, and well-known materials, as well as existing molding equipment, with little if any modification.

Yet another object of the invention lies in the provision of improved sealing devices possessed of the above advantages, in which the cost of fabrication may be of a reasonably low order, directly comparable with existing prior art devices, thereby permitting consequent wide sale, distributiion and use.

A feature of the invention lies in the fact that it may be formed in either of two principal embodiments, in one of which the device is seated in the outer of two concentric sealed parts, and in the other of which it is seated in the inner of two concentric sealed parts.

These objects and features, as well as other incidental ends and advantages, will more fully appear in the progress of the following disclosure and be pointed out in the appended claims.

In the drawing, to which reference will be made in the specification, similar reference characters have been employed to designate corresponding parts throughout the several views.

Figure 1:
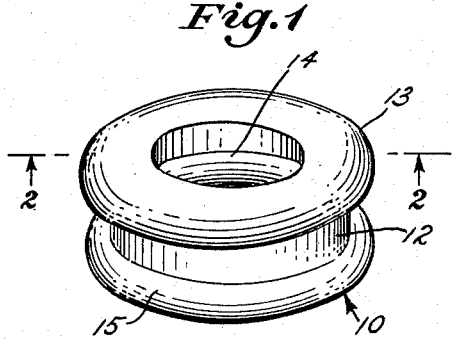
FIGURE 1 is a view in perspective of a first embodiment of the invention.
Figure 2:
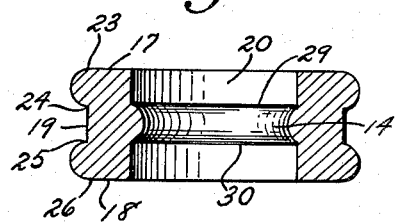
FIGURE 2 is a longitudinal sectional view thereof, as seen from the plane 2—2 in FIGURE 1.

In accordance with the first embodiment of the invention, generally indicated by reference character 10, there is illustrated in FIGURES 1 and 2 of the drawing a cylindrical body or ring 12, having a first outwardly disposed bead 13 thereon, a second inwardly disposed bead 14, and a third outwardly disposed bead 15.

The cylindrical body 12 is bounded by an upper surface 17, a lower surface 18, an outer cylindrical surface 19, and an inner cylindrical surface 20. The height and effective diameter of the body 12 will vary with the dimensions of the parts to be sealed, and the pressure differentials under which the device must operate, but may be varied from the dimensions illustrated through a relatively wide range.

The first outwardly disposed bead 13 is, as are the beads 14 and 15, molded integrally with the body 12, and is of a radius varying from approximately ¼ to ⅓ the thickness of the cylindrical body as measured between the surfaces 19 and 20. It commences at an upward point 23 and terminates at a lower point 24 on the outer surface 19. The second outwardly disposed bead 15 is similar, and symmetrically arranged, beginning at an upper point 25 on the surface 19, and terminating at a lower point 26 on the lower surface 18.

The third bead 14 is also similar, but extends inwardly from the inner cylindrical surface 20 of the body 12, commencing at an upper point 29 and terminating at a lower point 30.

Figure 3:
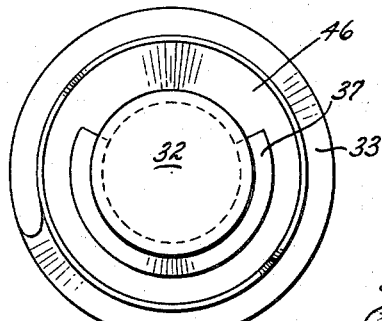
FIGURE 3 is a plan view of a threaded bushing and concentrically disposed rotating shaft containing the first embodiment.
Figure 4:
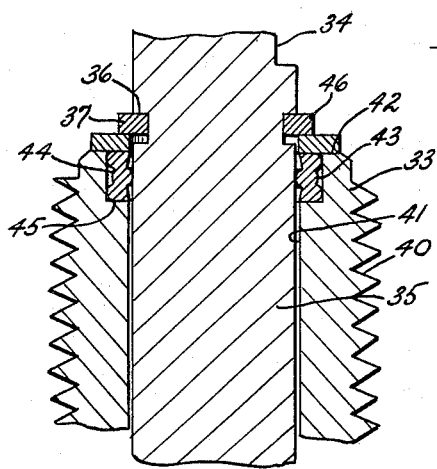
FIGURE 4 is a longitudinal fragmentary sectional view thereof, as seen from the plane 4—4 in FIGURE 3.
Figure 6:
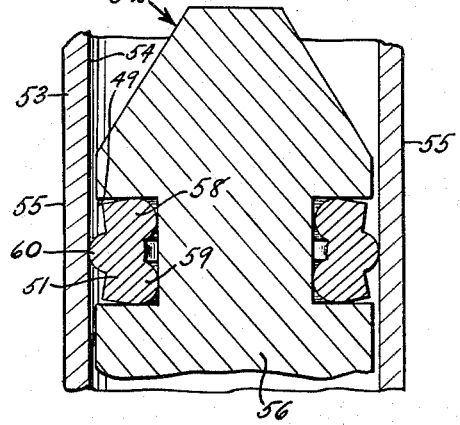
FIGURE 6 is a fragmentary longitudinal sectional view showing a second embodiment of the invention.

Referring to FIGURES 3 and 4 in the drawing, there is illustrated a typical construction in which the first embodiment 10 has utility. As seen in these figures, a rotating shaft 32 is disposed within a threaded bushing 33, the bushing in turn being suitably anchored in an opening in a wall (not shown) or similar supporting construction. The shaft 32 is normally provided with a flat 34 suitable for engagement with a control knob (not shown), and a segment 35 of the shaft 32 extends through the central bore in the bushing 33. Disposed a short distance below the flat 34 is an annular groove 36 which accommodates a snap ring 37. The bushing 33 includes a threaded outer surface 40 and a relatively smooth inner surface 41 forming the bore in which the shaft 32 is disposed An end surface 42 is provided with a rabbeted recess 43 in which the device 10 is seated, the recess including a longitudinal surface 44 and a transverse surface 45.

From a consideration of FIGURE 4, it will be observed that the height of the body 12 is somewhat greater than the depth of the recess 43, and the device is placed under compression by the use of a metallic washer 46 maintained in position by the snap ring 37 thereupon. After assembly, the third bead 15 will resiliently contact the outer surface of the shaft 32, and permit rotation of the shaft without binding, the greater friction developed by the seating of the device within the rabbet 43 preventing any relative movement between the device and the bushing 33. It will be observed that as the the cylindrical body 12 is distorted outwardly at the central portion thereof, considerable variation in the diameter of the shaft 32 may be present without affecting the efficacy of the sealing action. As wear occurs on the third bead 15, the body 12 will tend to return to its normal unstressed condition, maintaining an even greater surface contact with the surface of the shaft 32, as wear progresses.

Figures 5, 7:
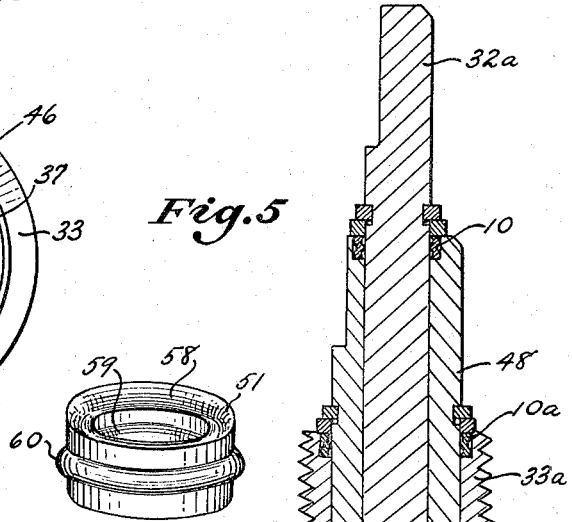
FIGURE 5 is a longitudinal fragmentary sectional view showing the device installed in conjunction with two concentrically arranged shafts in a single bushing.
FIGURE 7 is a perspective view of the second embodiment.

In the construction shown in FIGURE 5, parts corresponding to those of the construction shown in FIGURES 1 to 4 have been designated by similar reference characters, with the additional suffix "a." In this construction, an additional hollow shaft 48 surrounds the shaft 32a, and is interposed between the shaft 32a and the bushing 33a. The two devices 10 and 10a, which effect seals between the shaft 32a and the shaft 47, as well as the shaft 47 and the bushing 33a, are identical in construction and function, except that the device 10a disposed in the bushing 33a is of accordingly larger diameter.

Turning now to the second embodiment of the invention, generally indicated by reference character 52, there is illustrated a pump or similar structure including a barrel 53 having an inner surface 54 and an outer cylindrical surface 55. A plunger 56 may be of conventional construction, and in the form of a cylindrical body. The sealing device 51 is positioned in a groove or recess 49, and differs from that shown in the first embodiment in that it is anchored in a convex surface rather than a concave surface, and performs its sealing function with a radially outward force. Thus, the first and second beads 58 and 59 are disposed on the inner surface of the body 57, and the third bead 60 is disposed centrally on the outer surface thereof. As the sealing pressures involved in axial movement are substantially greater than those involved in the rotational movement illustrated in the first embodiment, greater sealing forces are required, and this is obtained by enlarging the size of the beads, so as to partially overlap, thereby giving greater rigidity in a radial direction.

I wish it to be understood that I do not consider the invention limited to the precise details of structure shown and set forth in this specification, for obvious modifications will occur to those skilled in the art to which the invention pertains.

I claim:
1. In a multi-ribbed seal device for sealing one cylindrically shaped member with respect to another concentrical disposed member for permitting relative movement therebetween, the improvement comprising: one of said members having a recess therein, a resilient sealing body having a first inner cylindrical surface and a second outer cylindrical surface, first and second annular beads extending radially from one of said first and second surfaces in mutually parallel relation, and a third annular bead extending radially from the other of said surfaces, said first and second beads being disposed in parallel planes on either side of said third bead, said body being disposed in said recess, wherein said first and second beads contact one of said cylindrical members, and said third bead contacts the other of said cylindrical members, each of said first, second and third beads having an arcuate cross-section, the center of which is located in one of said first and second cylindrical surfaces.

2. In a multi-ribbed seal device for sealing one cylindrically shaped member with respect to another concentrical disposed member for permitting relative movement therebetween, the improvement comprising: one of said members having a recess therein, a resilient sealing body having a first inner cylindrical surface and a second outer cylindrical surface, first and second annular beads extending radially from one of said first and second surfaces in mutually parallel relation, and a third annular bead extending radially from the other of said surfaces, said first and second beads being disposed in parallel planes on either side of said third bead, said body being disposed in said recess, wherein said first and second beads contact one of said cylindrical members, and said third bead contacts the other of said cylindrical members; and means for exerting an axially disposed compressive force on said body to provide a resilient disposition for radial distortion thereof, each of said first, second and third beads having an arcuate cross-section, the center of which is located in one of said first and second cylindrical surfaces.

References Cited by the Examiner
UNITED STATES PATENTS

| 1,697,814 | 1/28 | Forbes | 277—178 |
| 2,356,947 | 8/44 | Franger et al. | 277—213 X |
| 2,401,960 | 6/46 | Franger | 277—213 X |
| 2,421,659 | 6/47 | Sutton et al. | 277—207 |

FOREIGN PATENTS

| 814,977 | 9/51 | Germany. |
| 13,928 | 8/05 | Great Britain. |

EDWARD V. BENHAM, *Primary Examiner.*